United States Patent Office 3,426,023
Patented Feb. 4, 1969

3,426,023
1-(4'-METHYL-6'-METHOXY-2'-PYRIMIDINYL)
3-METHYL-5-METHOXYPYRAZOLE
Takeo Naito, Ichikawa-shi, Yasuo Oshima, Tokyo, Toru Yoshikawa, Urawa-shi, Akira Kasahara, Ichikawa-shi, Renzo Domori, Chiba-ken, and Yoshiaki Nakai and Wataru Tsukada, Tokyo, Japan, assignors to Daiichi Seiyaku Company, Limited, Tokyo, Japan, a corporation of Japan
No Drawing. Filed Apr. 21, 1966, Ser. No. 544,081
Claims priority, application Japan, Apr. 23, 1965, 40/24,014, 40/24,015
U.S. Cl. 260—256.4     1 Claim
Int. Cl. C07d 57/00

ABSTRACT OF THE DISCLOSURE

1 - (4'-methyl-6'-methoxy-2'-pyrimidinyl) - 3 - methyl-5-methoxypyrazole is a novel compound which is useful as an analgesic, anti-pyretic and anti-inflammatory agent.

---

The present invention relates to a novel derivative of alkoxypyrazole which has analgesic, antipyretic and anti-inflammatory properties. More particularly it relates to 1 - (4'-methyl-6'-methoxy-2'-pyrimidinyl)-3-methyl-5-methoxypyrazole and its manufacturing method. The present invention also relates to a novel intermediate which is produced in the above-mentioned method.

An object of the present invention is to provide a novel compound which has excellent analgesic, anti-pyretic and anti-inflammatory properties. Another object is to provide 1-(4'-methyl-6'-methoxy-2'-pyrimidinyl)-3-methyl-5-methoxypyrazole. A further object is to provide a method for manufacturing the same. Still a further object is to provide a novel intermediate which is produced by the method of the present invention. Yet further object will appear hereinafter.

1 - (4'-methyl-6'-methoxy-2'-pyrimidinyl) - 3 - methyl-5-methoxypyrazole of this invention shows analgesic, anti-pyretic, and anti-inflammatory properties in experimental animals. The analgesic effect was tested by the application of pressure- or electric-stimulation to a mouse's tail and by the observation of increase of pain threshold after administration of the test compound. Thus, in intraperitoneal injection, this compound was found to be 2.2 times and 2.4 times as analgesic as aminopyrine by the pressure- and electric-stimulating method, respectively. Anti-pyretic activity of this compound tested in rabbits fevered by intravenous injection of a pyrogen was estimated to be about 0.5 times aminopyrine when compared by intraperitoneal injection. The anti-inflammatory activity was estimated from the ability of a test compound inhibiting the local oedema induced in rat by injecting formaldehyde or carrageenin into the posterior paw. In experiments by intraperitoneal injection, this compound was about 4 times and 3 times as effective as aminopyrine in inhibiting formaldehyde- and carrageenin oedema, respectively. LD$_{50}$(24 hrs.) of this compound determined in mice was 0.7 g./kg. in intraperitoneal injection, and was 1.09 g./kg. in oral administration.

The 1-(4'-methyl-6'-methoxy-2'-pyrimidinyl)-3-methyl-5-methoxypyrazole of the present invention is manufactured by a method represented by the following reaction Formula A.

(A)
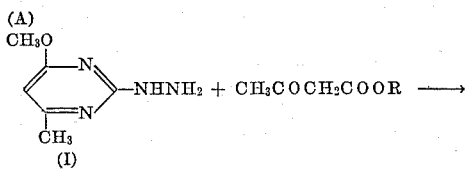

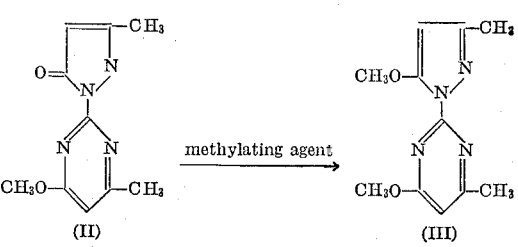

wherein R is a lower alkyl group.

That is, 1 - (4'-methyl-6'-methoxy-2'-pyrimidinyl) - 3-methyl-5-methoxypyrazole (III) is manufactured by reacting 4-methyl-6-methoxy-2-pyrimidinylhydrazine (I) with a lower alkyl acetoacetate in a solvent selected from the group consisting of methanol and hydrous methanol in the presence of a base to produce 1-(4'-methyl-6'-methoxy-2'-pyrimidinyl) - 3 - methyl - 3 - pyrazoline - 5-one (II) and then reacting a methylating agent with the product (II).

In more detail, the compound (II) is produced by heating the compound (I) and a lower alkyl acetoacetate in methanol or hydrous methanol at 60°–90° C. for several hours in the presence of a base such as an alkali metal hydroxide or methoxide. It is also practicable, however, to heat the compound (I) and a lower alkyl acetoacetate first in methanol at 60°–90° C. for 2 hours, then add the above-mentioned base thereto and heat the mixture.

The compound (II) thus produced can be isolated in a free state or in the state of its alkali metal salt. In either of those states, the said compound can be used as a raw material for the subsequent step. Further the Formula (II) represents also its tautomer, 1-(4'-methyl-6'-methoxy-2'-pyrimidinyl) - 3 - methyl - 5 - hydroxypyrazole.

Next, to describe the step of methylation, methyl halogenide, dimethyl sulfate, methyl acrylsulfonate and diazomethane can be used as the methylating agent.

The reaction conditions vary according to the kind of the methylating agent and the reaction, for example, of the compound (II) with dimethyl sulfate can be carried out advantageously by heating them in hydrous methanol, methanol, dimethylformamide, dimethylacetamide, or their mixture as a solvent at 20°–100° C. for 2–20 hours in the presence of a base such as an alkali metal hydroxide or metal methoxide. When diazomethane is used as the methylating agent, the reaction proceeds very easily in ether or dichloroethane at room temperature in good yields.

Further the compound (III) can be manufactured by the following method (B), too.

(B)
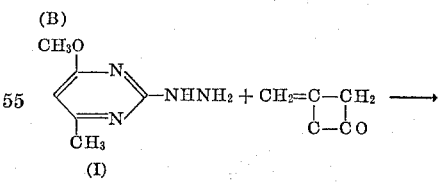

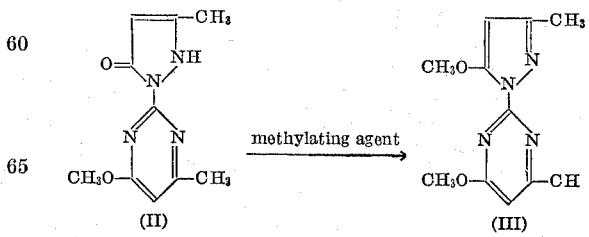

According to the method (B), the compound (II) is produced in one step operation by heating the compound (I) in an organic solvent such as benzene, dioxane or chloroform, which does not react with ketene dimer, at 70°–100° C. for 1–10 hours. In this reaction, an excess amount of the compound (I) promotes the reaction. But, the reaction of the compound (I) with equimolar amounts of ketene dimer at a lower temperature and for a shorter time than in the above, for example, at 30°–40° C. and for about 0.5–1 hour, in an organic solvent such as benzene, dioxane or chloroform which does not react with ketene dimer produce $N^2$-(4'-methyl-6-methoxy-2'-pyrimidinyl)-acetoacetohydrazide. By heating the separated product in an organic solvent such as ethanol or dioxane at 70°–100° C. for 1–10 hours or by melting it without solvent, the compound (II) can be produced quantitatively as a result of dehydration and ring-closure. Further, the compound (III) can be obtained by methylating the compound (II) in the same way as described in the method (A).

For a clearer understanding of the present invention, the following specific examples are given. These examples are intended to be merely illustrative of the present invention and not in limitation thereof. Unless otherwise specified, all parts are by weight.

Example 1

To a mixture consisting of 5.6 g. of sodium hydroxide, 8 ml. of water and 30 ml. of methanol, 8.7 g. of 4-methyl-6-methoxy-2-pyrimidinylhydrazine and 7.3 g. of ethyl acetoacetate were added and the reaction mixture was refluxed for 2 hours. After cooling, the precipitate was collected by filtration, dissolved in water and neutralized with dilute acetic acid. The separated crystals were collected by filtration (12.1 g., 90%). Recrystallization from methanol-water gave 1-(4'-methyl-6'-methoxy-2'-pyrimidinyl) - 3 - methyl-3-pyrazoline-5-one as colorless needles, M.P. 102°–104° C.

Analysis.—Calcd. for $C_{10}H_{12}O_2N_4 \cdot H_2O$: C, 50.42; H, 5.92; N, 23.52. Found: C, 50.40; H, 5.76; N, 23.34.

Then, 7.7 g. of 1-(4'-methyl-6'-methoxy-2'-pyrimidinyl)-3-methyl-3-pyrazoline-5-one, 70 ml. of methanol and 5 g. of dimethyl sulfate were heated at 60° C. To the stirred reaction mixture, 1.6 g. of sodium hydroxide and 130 ml. of methanol were added dropwise. Further the reaction mixture was refluxed for 2.5 hours and the solvent was distilled off. The residue was dissolved in a small amount of water and extracted with chloroform. Chloroform was distilled off from the extract and the residue obtained thereby was chromatographed on alumina. The fraction eluted with cyclohexane gave 1-(4'-methyl-6'-methoxy-2'-pyrimidinyl) - 3-methyl-5-methoxypyrazole (3.08 g., 40%) as colorless prisms, M.P. 89°–90° C.

Analysis.—Calcd. for $C_{11}H_{14}O_2H_4$: C, 56.40; H, 6.02; N, 23.92. Found: C, 56.31; H, 6.08; N, 23.66.

Example 2

A mixture of 16.3 g. of 4-methyl-6-methoxy-2-pyrimidinylhydrazine, 13.7 g. of ethyl acetoacetate and 16.3 ml. of methanol was refluxed with heating for 2 hours on a water bath. After a mixture of 4.7 g. of sodium hydroxide, 4.7 ml. of water and 27 ml. of methanol was added dropwise thereto at about 50° C., the reaction mixture was further refluxed for 2 hours. After the reaction was completed, methanol was distilled off and the residue was dissolved in 130 ml. of water. The solution was adjusted to pH 6 with acetic acid. The precipitated crystals were collected by filtration, washed with water and dried to give 24 g. (yield 95.3%) of the crystals, M.P. 97°–98° C. Recrystallization from ligroin gave 1-(4'-methyl-6'-methoxy-2'-pyrimidinyl) - 3 - methyl-3-pyrazoline-5-one, M.P. 102°–103° C.

To a solution of 4.76 g. of 1-(4'-methyl-6'-methoxy-2'-pyrimidinyl)-3-methyl-3-pyrazoline-5-one in 200 ml. of ether was added an ether solution containing six molar equivalents of diazomethane and the reaction mixture was allowed to stand at room temperature for 20 hours. After distilling off the solvent, the residue was dissolved in 160 ml. of water, made alkaline (pH 10) with sodium hydroxide solution and extracted three times with 140 ml. of benzene. The extract was washed with a small amount of water, dried over sodium sulfate and evaporated to give a crystalline mass. Recrystallization from isopropyl ether gave 1-(4'-methyl-6'-methoxy-2'-pyrimidinyl)-3-methyl-5-methoxypyrazole (3.96 g., 84%) as colorless prisms, M.P. 90°–92° C.

Example 3

In place of sodium hydroxide in Example 2 sodium methoxide prepared from 2.45 g. of sodium and 30 ml. of methanol was used to give 1-(4'-methyl-6'-methoxy-2'-pyrimidinyl)-3-methyl-3-pyrazoline-5-one (94%) by the same procedure as in Example 2.

4.76 g. of 1-(4'-methyl-6'-methoxy-2'-pyrimidinyl)-3-methyl-3-pyrazoline-5-one was dissolved in 20 ml. of methanol and then sodium methoxide solution prepared from 0.69 g. of sodium and 20 ml. of methanol, and 4.26 g. of methyl iodide were added dropwise thereto during 30 minutes at the same time. The reaction mixture was refluxed for further 3 hours and concentrated to dryness in vacuo. The residue was dissolved in 60 ml. of water, made alkaline (pH 10) with sodium hydroxide solution and extracted with chloroform. The extract was dried over anhydrous sodium sulfate and evaporated to give a syrupy residue, which was adsorbed on aluminacolumn and eluted with cyclohexane. The obtained product was recrystallized from isopropylether to give 1 - (4' - methyl - 6' - methoxy - 2' - pyrimidinyl) - 3 - methyl-5-methoxypyrazole (1 g., 21.3%) as colorless prisms, M.P. 90° C.

Example 4

1.54 g. of 4-methyl-6-methoxy-2-pyrimidinylhydrazine was suspended in 5 ml. of dioxane. Thereto was added 0.98 g. of ketene dimer, and was reacted at 100° C. for 5 hours. After the reaction was completed, the solvent was evaporated under reduced pressure. Water was added to the residue, and the precipitated crystals were collected by filtration. Recrystallization from water-methanol gave 1 - (4' - methyl - 6' - methoxy - 2' - pyrimidinyl) - 3 - methyl-3-pyrazoline-5-one (1.95 g., 82%) as colorless needles, M.P. 102°–104° C.

To a stirred solution of 4.76 g. of 1-(4'-methyl-6'-methoxy-2'-pyrimidinyl)-3-methyl-3-pyrazoline-5-one in 12 ml. of dimethyl-formamide were added at 35°–40° C. a solution of sodium methoxide (1.4 g. of sodium in 18 ml. of methanol) and 7.6 g. of dimethyl sulfate dropwise at the same time. The reaction mixture was refluxed for further 4 hours and concentrated to dryness in vacuo. The residue was dissolved in 60 ml. of water and extracted three times with 80 ml. of benzene. The combined extract was washed with a small amount of water, dried over anhydrous sodium sulfate and evaporated. The syrupy residue was distilled in vacuo to give colorless oil which gradually solidified to colorless prisms. Recrystallization from isopropylether afforded colorless prisms, M.P. 90° C., of 1-(4'-methyl-6'-methoxy-2'-pyrimidinyl)-3-methyl-5-methoxypyrazole (2.46 g., 52.5%).

Example 5

15.4 g. (0.1 mol) of 4-methyl-6-methoxy-2-pyrimidinylhydrazine was suspended in 50 ml. of dioxane. Thereto was added a solution of 10.1 g. (0.12 mol) of ketene dimer in 40 ml. of dioxane, whereby heat was generated and the crystals were dissolved to disappear.

After the reaction mixture was allowed to stand at room temperature for further 30 minutes, the solvent was evaporated under reduced pressure. A small amount of water was added to the residue which then gave a crystalline mass. The said mass was filtered and washed with water. Recrystallization from ethanol gave $N^2$-(4'-methyl-6'-methoxy-2'-pyrimidinyl)-acetoacetohydrazide (19.6 g., 82%), M.P. 154°–155° C. (decomposition).

*Analysis.*—Calcd. for $C_{10}H_{14}N_4O_3$: C, 50.40; H, 5.90; N, 23.50. Found: C, 50.64; H, 6.00; N, 23.33.

1 g. of $N^2$-(4′-methyl-6′-methoxy-2′-pyrimidinyl)-acetoacetohydrazide was fused at 180° C. for 5 minutes. After cooling the product was recrystallized from methanol-water to give 1-(4′-methyl-6′-methoxy-2′-pyrimidinyl)-3-methyl-3-pyrazoline-5-one (0.87 g., 87%), as colorless needles, M.P. 102°–104° C.

To a stirred solution of 4.76 g. of 1-(4′-methyl-6′-methoxy-2′-pyrimidinyl)-3-methyl-3-pyrazoline-5-one in 10 ml. of methanol were added at 30°–40° C. a solution of sodium methoxide (1.4 g. of sodium in 20 ml. of methanol) and 7.6 g. of dimethyl sulfate dropwise at the same time. The reaction mixture was refluxed for further 4 hours and concentrated. The residue was dissolved in 60 ml. of water and extracted with chloroform. After evaporating the solvent, the syrupy residue was chromatographed on alumina. From the cyclohexane fraction, there was obtained the crude product which was recrystallized from isopropylester to give 1-(4′-methyl-6′-methoxy-2′-pyrimidinyl)-3-methyl-5-methoxypyrazole (1.94 g., 41%) as colorless prisms, M.P. 90°–92° C.

Example 6

15.4 g. of 4-methyl-6-methoxy-2-pyrimidinylhydrazine was suspended in 200 ml. of benzene. Thereto was added dropwise a solution of 10 g. of ketene dimer in 40 ml. of benzene. The reaction was carried out at 30°–40° C. for 1 hour. After the reaction was completed the solvent was evaporated under reduced pressure. A small amount of water was added to the residue, and the precipitated crystals were collected by filtration. The crystals thus obtained were washed with water and air-dried to give $N^2$-(4′-methyl-6′-methoxy - 2′ - pyrimidinyl) - acetoacetohydrazide (21 g., 90%) as crude crystals.

The crystals thus obtained were dissolved in 500 ml. of methanol. The solution was refluxed for 10 hours. After the reaction was completed, the solvent was evaporated. Water was added to the residue, and the precipitated crystals were collected by filtration to give 1-(4′-methyl-6′-methoxy-2′-pyrimidinyl)-3-methyl-3-pyrazoline-5-one (18 g., 87%). Recrystallization from benzene gave the pure product as colorless needles, M.P. 102°–104° C.

The subsequent treatment was carried out in the same way as in Example 1 to give 1-(4′-methyl-6′-methoxy-2′-pyrimidinyl)-3-methyl-5-methoxypyrazole.

What is claimed is:
1. 1 - (4′ - methyl - 6′ - methoxy - 2′ - pyrimidinyl) - 3-methyl-5-methoxypyrazole.

References Cited

UNITED STATES PATENTS 3,040,047  6/1962  Sirakawa et al. _____ 260—256.4

OTHER REFERENCES

Vystrcil et al.: Chem. Abstracts, vol. 46 (1952), col. 7567.

Elderfield: Heterocyclic Compounds, vol. 5 (1957), pp. 48–9, 114–5, 123.

Koenigs et al.: Berichte, vol 59 (1926), p. 320.

ALEX MAZEL, *Primary Examiner.*

R. J. GALLAGHER, *Assistant Examiner.*

U.S. Cl. X.R.

260—999